Patented Apr. 4, 1950

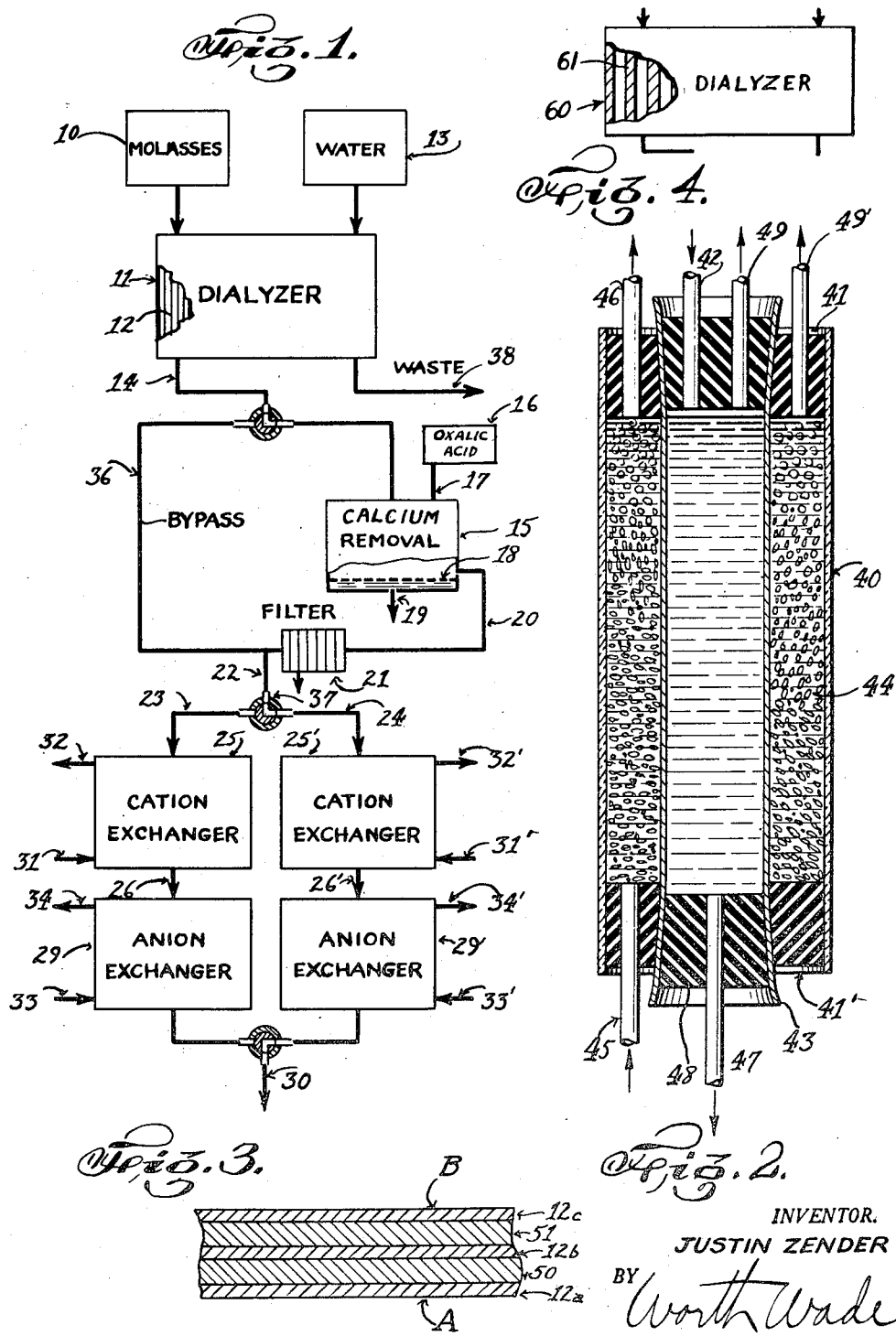

2,502,614

UNITED STATES PATENT OFFICE 2,502,614

APPARATUS FOR PURIFYING SOLUTIONS

Justin Zender, Ardsley, N. Y., assignor, by mesne assignments, to American Viscose Corporation, Wilmington, Del., a corporation of Delaware Application June 17, 1944, Serial No. 540,839

4 Claims. (Cl. 210—8.5)

This invention relates in general to an apparatus for purifying molasses and the like, and to a membrane for use in purifying molasses and similar complex aqueous dispersions or mixtures containing both colloidal and crystalloidal impurities.

It is the object of the invention to provide a dialyzing membrane for the purification of aqueous dispersions containing both colloids and crystalloids.

According to the present invention an aqueous solution containing both colloidal and crystalloidal impurities such as molasses, is dialyzed by passage through a composite membrane and the diffusate during passage through the composite membrane is passed in contact with an ion exchanger. In one embodiment of the invention the solution during dialysis is successively placed in contact with a cation exchanger and an anion exchanger or absorber.

Figure 1 is a diagrammatical representation of a process that may be used for purifying molasses.

Figure 2 represents a side elevation, partly in section of one embodiment of dialyzing apparatus.

Figure 3 is a cross-section of one embodiment of the dialyzing membrane of the invention.

Figure 4 is another form of dialyzing apparatus.

As shown in Figure 1, an aqueous solution containing the mixture of colloidal and crystalloidal substances is passed into contact with a dialyzing membrane and water is passed into contact with the other side of the membrane. For the membrane there may be employed any semi-permeable pellicle such, for example, as a hydrophilic film of regenerated cellulose; alkali soluble, water insoluble cellulose ether; gelatin; casein; de-acetylated chitin and the like or a hydrophobic material which is in the hydrophilic condition by reason of being precipitated as a film in an aqueous bath, as a result of which the film is in the wet gel state. Thus pellicles may be formed by precipitating a cellulose ester or a cellulose ether in an aqueous coagulating bath, such, for example, as nitro cellulose, cellulose acetate, ethyl cellulose and the like. These latter films must be kept in the wet gel state from the time of formation until the time of use for if they dry out before use they become hydrophobic and then they are not suitable in such state as dialyzing membranes. The dialyzing membrane may be used as such or after treatment to alter its permeability, for example, by impregnating it with gelatinous precipitates in accordance with my co-pending U. S. application, Ser. No. 413,804 filed Oct. 6, 1941, now Patent 2,361,000, October 24, 1944, or by forming in situ within the membrane a resin to reduce its porosity.

The dialyzing membrane may be in the form of a sheet or tube and a multiplicity of such membranes may be used in order to increase the capacity of the apparatus.

The diffusate, that is the aqueous solution of sugar and other water soluble crystalloids which diffuse through the membrane or membranes, is treated with an ion exchanger to remove the inorganic compounds in the resulting solution. The cationic exchangers which are satisfactory for carrying out the present invention are in general selected from the class of compounds capable of exchanging ions from their structure for ions contained in materials brought into contact therewith. The class of materials includes the class of so-called "tannin resins" made from organic resins such as quebracho, catechol and tannin, and ion exchange carbonaceous materials derived from the sulfonation of coal, lignite and the like. Especially satisfactory are phenol-aldehyde cation exchangers. Other suitable ionic exchangers are shown in U. S. Patent No. 2,319,359 to Hans Wassenegger and 2,251,234 to Robert C. Swain, and the principles of regeneration are disclosed in "Demineralizing solutions by a two-step ion exchange process" by Howard L. Tiger and Sidney Sussman, Ind. & Eng. Chem. vol. 35 pp. 186–192 (February 1943).

The preferred cation exchanger at the present time is a "hydrogen cation exchanger" or "acid-regenerated" resin cation exchanger in the form of its sodium salt. When this sodium salt is washed with a dilute solution of an inorganic acid the sodium ion is displaced by the hydrogen ion of the acid. This acid resin exchanger is found to be most satisfactory in the use of the new process inasmuch as the purified molasses obtained thereby has only hydrogen as its positively charged ion. During the use of this material as an ionic exchanger, metallic cations gradually displace the hydrogen ion in the resin structure and a metallic salt of the resin exchanger is formed. To renew the ion exchanging ability of this resin it is merely necessary again to treat the resin with an inorganic acid, such as hydrochloric or sulfuric acid.

The preferred anion remover is a water-insoluble resin, such as that of U. S. Patent 2,251,-234, which is regeneratable by treatment with a dilute alkali.

The apparatus of the present invention will be described with reference to the purification of molasses but it is understood that the invention is not limited in this way but may be utilized for the purification and separation of any complex aqueous dispersion which contains both organic colloids and crystalloids such as rubber latex, blood, milk, maple syrup, waste liquors from the mercerization of cellulose and similar dispersions.

In Figure 1, there is shown a system for the purification of molasses stored in the reservoir 10. The molasses is passed into a plate dialyzer 11 comprising a multiplicity of cells separated by membranes 12 formed of any suitable semi-permeable material, water being passed through alternate cells of the dialyzer, the water being obtained from the reservoir 13. In the dialyzer the colloids are retained and the crystalloids comprising the sugar and inorganic water soluble salts passed through the membrane into the diffusate. The diffusate is conducted through the pipe 14 preferably into a tank 15 in which calcium may be removed by introducing oxalic acid from the vessel 16 by means of the pipe 17. The precipitate of calcium oxalate is allowed to settle in the tank through the perforated plate 18 and may be withdrawn by means of the exhaust pipe 19 while the calcium-free solution is drawn off from above the precipitate by means of the pipe 20 and preferably passed through a filter press 21 for the purpose of removing any suspended calcium oxalate. The resulting solution is passed through the pipe 22 alternatively through the cation exchanger contained in one of the chambers 25 or 25' passing through either pipe 23 or pipe 24. The cation-free liquid being drawn off from the bottom of these chambers through the pipes 26 and 26' is passed through one or the other of the containers 29 or 29' which hold the anion exchanger. The salt-free solution may be withdrawn from either of the containers 29 or 29' through the pipe 30 and passed to a suitable evaporator not shown, or otherwise treated if desired. The liquid is diverted from tank 25 to 25' by means of a two-way valve 37.

For regenerating the cation exchanger in the vessels 25 and 25', a suitable acid may be passed through one or the other of these containers by means of pipes 31 and 31' and removed through pipes 32 and 32'. For regenerating the anion exchanger in the containers 29 and 29' a solution of potassium bicarbonate may be introduced therein by means of pipes 33 and 33' and removed through pipes 34 and 34'.

The dialyzate comprising the spent molasses may be withdrawn from the dialyzer 11 by means of the pipe 34 and collected in a reservoir not shown and thereafter treated as desired.

It is to be understood that if desired the treatment of the solution with the agents to remove calcium in the tank 15 and the subsequent filtration of the treated solution is optional and these steps and the necessary apparatus therefor may be eliminated or by-passed by means of the pipe 36, which connects the pipe 14 with the pipe 22.

Numerous variations may be made in the apparatus above described. For example, there is shown in Figure 2 one embodiment of a suitable device for accomplishing the simultaneous dialyzing and ion exchange of the solution. This device comprises a container such as a glass tube 40 having closures 41 and 41' at each end, the closure 41 being pierced by pipes 46 and 49' and the closure 41' being pierced by the pipe 45 at each end, the pipes terminating at a short distance from the inside of the closure and forming a support for a dialyzing membrane in the form of a tube 43 at each end, the space 44 between the membrane and the wall of the container 40 being filled with a solid ion exchanger. In operation the molasses, or the solution to be treated, is introduced into the interior of the tubular membrane 43 by means of the pipe 42 and water is introduced into the solid ion exchanger through the pipe 45 so that the water soluble crystalloids contained in the tube 43 will diffuse through the membrane wall into the water which surrounds the ion exchanger in the space 44, the aqueous solution filtering through the ion exchanger and being withdrawn through the pipe 46. Thus in a single passage the solution is both dialyzed and subjected to treatment by the ion exchanger. The treated solution withdrawn through the pipe 46 may then be passed into contact with the anion exchanger in a separate vessel. The spent molasses solution passes out through pipe 47 which also acts as a support for closure 48 at the exit end of the inner tube. There is also provided a vent 49 for the inner compartment which together with pipe 42 acts as a support for closure 48 at the entrance end of the inner tube. There is also provided a vent for the outer space 44 in the form of pipe 49' passing through closure 41.

While the apparatus shown in Figure 2 utilizes tubular membranes, it is also possible to carry out the same process with membranes in the form of films by using as shown in Fig. 4 a plate dialyzer 60 of the type indicated by reference character 11 in Figure 1. The cells 61 in this plate dialyzer in which water is introduced accordingly will contain an ion exchanger and will be comparable with space 44 in Figure 2.

Similarly it is also possible to provide a modified apparatus for carrying out the same dialyzing process by using a multi-layer membrane of the type shown in Figure 3, which constitutes a preferred embodiment of composite laminar membrane in accordance with my invention, and comprises three dialyzing semi-permeable membranes 12a, 12b and 12c, the membranes 12a and 12b being separated by a continuous layer 50 of a cation exchanger and the membranes 12b and 12c being separated by a continuous layer 51 of an anion exchanger. The solution to be treated is brought into contact with the surface A of the composite membrane and water is passed into contact with the opposite surface B. Thus both dialysis and ion removal takes place simultaneously and concurrently when such a composite membrane is employed and since this membrane is in sheet form, it may be utilized in a plate dialyzer of the type indicated by the reference numeral 11 in Figure 1.

In the present embodiment, the three membranes 12a, 12b and 12c are formed of films of regenerated cellulose and are therefore identical but it is to be understood that these membranes may be formed of different semi-permeable pellicles.

To facilitate forming the ion exchangers into a layer, the solid ion exchanger may be first admixed with a water soluble coalescing agent such as an alkali soluble, water insoluble cellulose ether, gelatin, casein, gum tragacanth, and the like, which substances when moistened with water form a gel and thus maintain the solid granules of the ion exchanger in the form of a layer while permitting the diffusion of aqueous solutions therethrough. As an alternative, the ion exchangers, while in a water soluble form, are incorporated in the non-fibrous dialyzing membrane and the membrane then treated to convert the ion exchanger into a water insoluble form and thus deposit it in situ within the membrane.

The invention having been described what is claimed is:

1. A dialyzing apparatus comprising two chambers separated by a composite laminar membrane comprising outer semi-permeable laminae and at least one layer of a solid, water-insoluble ion-removing material therebetween, conduit means for introducing and removing a liquid to and from one of the chambers, and conduit means for introducing and removing a liquid to be dialyzed to and from the other chamber.

2. Apparatus as defined in claim 1 in which there are at least two layers of a solid, water-insoluble ion-removing material, one of said layers nearer the chamber containing the liquid to be dialyzed comprising a material for exchanging cations and replacing them with hydrogen ions, and another layer comprising an anion-removing material.

3. Apparatus as defined in claim 1 comprising a semi-permeable lamina between each two adjacent layers of ion-removing material.

4. Apparatus as defined in claim 2 in which the laminae are formed of regenerated cellulose pellicles.

JUSTIN ZENDER.

REFERENCES CITED

The following references are of record in the file of this patent:

UNITED STATES PATENTS

| Number | Name | Date |
|---|---|---|
| 345,810 | Schwengers | July 20, 1886 |
| 1,546,908 | Lapenta | July 21, 1925 |
| 1,868,955 | Tachikawa | July 26, 1932 |
| 1,878,237 | Hoffman | Sept. 20, 1932 |
| 2,075,127 | Mead | Mar. 30, 1937 |
| 2,104,501 | Adams et al. | Jan. 4, 1938 |
| 2,140,341 | Wallach | Dec. 13, 1938 |
| 2,155,318 | Liebknecht | Aug. 18, 1939 |
| 2,191,365 | Boyd | Feb. 20, 1940 |
| 2,201,812 | Daniel | May 21, 1940 |
| 2,225,024 | Weber | Dec. 17, 1940 |
| 2,226,134 | Liebknecht | Dec. 24, 1940 |
| 2,251,234 | Swain | July 29, 1941 |
| 2,264,654 | Boyd | Dec. 2, 1941 |
| 2,267,841 | Riley | Dec. 30, 1941 |
| 2,301,669 | Richter | Nov. 10, 1942 |
| 2,386,826 | Wallach et al. | Oct. 16, 1945 |
| 2,388,194 | Vallez | Oct. 30, 1945 |
| 2,388,222 | Behrman | Oct. 30, 1945 |

FOREIGN PATENTS

| Number | Country | Date |
|---|---|---|
| 116,691 | Australia | Mar. 9, 1943 |

OTHER REFERENCES

Subjection of Molasses Treated with Zeolites to the Steffens Process by Bachler, Industrial and Engineering Chemistry, vol. 18, N. 2, (Feb. 1926), pp. 180 to 182.

Demineralizing Solutions by a Two-step Ion Exchange Process by Howard L. Tiger and Sidney Sussman, Industrial and Engineering Chemistry, vol. 35, (Feb. 1943), pp. 186–192.